(12) United States Patent
Lee et al.

(10) Patent No.: US 8,631,144 B2
(45) Date of Patent: Jan. 14, 2014

(54) SYSTEM AND METHOD FOR SELECTION OF STREAMING MEDIA

(75) Inventors: Jaeyong Lee, Sammamish, WA (US); Jong-Sung Yoon, Bellevue, WA (US)

(73) Assignee: Vidiator Enterprises Inc., Nassau (BS)

( * ) Notice: Subject to any disclaimer, the term of this patent is extended or adjusted under 35 U.S.C. 154(b) by 378 days.

(21) Appl. No.: 12/518,070

(22) PCT Filed: Dec. 7, 2007

(86) PCT No.: PCT/US2007/086776
§ 371 (c)(1),
(2), (4) Date: Jun. 5, 2009

(87) PCT Pub. No.: WO2008/070832
PCT Pub. Date: Jun. 12, 2008

(65) Prior Publication Data
US 2010/0318671 A1  Dec. 16, 2010

Related U.S. Application Data (60) Provisional application No. 60/869,052, filed on Dec. 7, 2006.

(51) Int. Cl.
*G06F 15/16* (2006.01)

(52) U.S. Cl.
USPC ........... 709/231; 709/212; 370/330; 370/389; 725/115

(58) Field of Classification Search
USPC ............ 709/212, 231; 370/330, 389; 725/115
See application file for complete search history.

(56) References Cited

U.S. PATENT DOCUMENTS

| | | | | |
|---|---|---|---|---|
| 6,907,570 | B2 * | 6/2005 | Amir et al. | 715/720 |
| 7,107,010 | B2 * | 9/2006 | Heinonen et al. | 455/41.2 |
| 7,143,433 | B1 * | 11/2006 | Duan et al. | 725/115 |
| 2002/0133247 | A1 * | 9/2002 | Smith et al. | 700/94 |
| 2003/0005139 | A1 * | 1/2003 | Colville et al. | 709/231 |
| 2003/0093804 | A1 * | 5/2003 | Chang et al. | 725/95 |

(Continued)

FOREIGN PATENT DOCUMENTS

| | | |
|---|---|---|
| EP | 1675343 | 6/2006 |
| WO | 2006084503 | 8/2006 |

OTHER PUBLICATIONS

International Preliminary Report on Patentability for PCT/US2007/086776, mailed Jun. 18, 2009, 7 pages.

(Continued)

*Primary Examiner* — Thuong Nguyen
(74) *Attorney, Agent, or Firm* — Chin IP, PLLC; Davin Chin (57) ABSTRACT

A system reduces latency associated with accessing multiple sources of content provided to a mobile device. In one implementation, a streaming server receives multiple live encoded streams and makes the received encoded streams available to the mobile device. The mobile device instructs the streaming server as to which received encoded streams to provide to the mobile device. When the instructions indicate that the mobile device is requesting a different encoded stream, such as by using PAUSE and PLAY buttons on the mobile device, the streaming server switches the content streamed to the mobile device and provides the newly desired content to the mobile device.

14 Claims, 6 Drawing Sheets

(56) References Cited

U.S. PATENT DOCUMENTS

| | | | |
|---|---|---|---|
| 2005/0030885 A1* | 2/2005 | Langley et al. | 370/205 |
| 2005/0071437 A1* | 3/2005 | Bear et al. | 709/212 |
| 2005/0190794 A1* | 9/2005 | Krause et al. | 370/485 |
| 2006/0072596 A1* | 4/2006 | Spilo et al. | 370/412 |
| 2007/0083591 A1* | 4/2007 | Sengodan | 709/204 |
| 2007/0266122 A1* | 11/2007 | Einarsson et al. | 709/220 |
| 2008/0151885 A1* | 6/2008 | Horn et al. | 370/389 |
| 2008/0263219 A1* | 10/2008 | Bacchi et al. | 709/231 |
| 2009/0028109 A1* | 1/2009 | Huang et al. | 370/330 |

OTHER PUBLICATIONS

International Search Report and Written Opinion of the International Searching Authority, for PCT/US2007/086776, mailed May 19, 2008, 12 pages.

Office Action for EP Patent Application 07865376.3, mailed Mar. 5, 2010, 7 pages.

Office Action for CN Patent Application 200780045469.5, mailed Dec. 13, 2011, 7 pages.

* cited by examiner

SYSTEM AND METHOD FOR SELECTION OF STREAMING MEDIA

CROSS-REFERENCE TO RELATED APPLICATIONS

The present application is a national stage application of Patent Cooperation Treaty (PCT) Application No. PCT/US2007/086776, filed Dec. 7, 2007, which in turn claims priority to U.S. Provisional Patent Application Ser. No. 60/869,052, entitled "SYSTEM AND METHOD FOR SELECTION OF STREAMING MEDIA," filed Dec. 7, 2006. These priority applications are incorporated herein by reference their entireties.

TECHNICAL FIELD

This disclosure generally relates communication in a mobile communication environment. More particularly but not exclusively, the present disclosure relates to selection and switching between streams of media in a mobile communication environment.

BACKGROUND INFORMATION

Conventional mobile devices provide other functionality in addition to standard communication functions. Additional functionality includes text messaging, selection, retrieval and playback of various audio (e.g., MP3 files, ring tones, etc.) and video products (e.g., mpeg files, music videos, etc.), and the like. The downloaded content may be accessed upon receipt, stored for later use (if sufficient storage is available), or some combination of the two.

Conventional mobile devices access content by streaming the content from content providers and displaying the content as the content is received. The content can be provided by any number of content providers, such as the service provider, third-party providers, and the like. Typically, when a user desires to receive different content, the user must first disconnect from the current streaming content and then reconnect with a provider of the now desired content, such as reverting to an existing WAP page to select a different content source. Unfortunately, the process of disconnecting and reconnecting generally results in a great deal of "down time" (e.g., one to two minutes is not uncommon) and has a negative effect on the user's overall experience with the content.

BRIEF SUMMARY

One aspect provides a method in a mobile communication environment to switch from a first live encoded stream of media to a second live encoded stream of media. The method includes receiving said first and second streams from one or more sources, receiving a first request for said first stream from a mobile device, providing the requested first stream to said mobile device in a streaming session, receiving a second request from said mobile device to switch from said first stream to said second stream, and responsive to said second request, switching from said first stream to said second stream and providing said second stream to said mobile device without disconnecting said streaming session.

In an aspect, said second request from said mobile device is based on activating a PAUSE button on said mobile device to cause said streaming session to pause in providing said first stream; responsive to said activation of said PAUSE button, enabling a PLAY button on said mobile device; and activating said PLAY button to cause said streaming session to switch from said first stream to said second stream as input.

In an aspect, said activating said PAUSE button and said enabling and activating said PLAY button are allowed if said first and second streams have a short duration. The method further including, if said first stream has a long duration relative to said short duration, responsive to activation of said PAUSE button on said mobile device, pausing the streaming session in providing said first stream; responsive to said activation of said PAUSE button, enabling a FAST FORWARD button and a REWIND button on said mobile device; responsive to activation of said FAST FORWARD button, causing said streaming session to switch from said first stream to said second stream as input; and responsive to activation of said REWIND button, causing said streaming session to switch from said first stream to a previous stream as input.

One aspect provides a mobile communication system to switch from a first live encoded stream of media to a second live encoded stream of media. The system includes first means for receiving said first and second streams from one or more sources; and second means for receiving a first request for said first stream from a mobile device and for providing the requested first stream to said mobile device in a streaming session; wherein said second means for receiving said first request receives a second request from said mobile device to switch from said first stream to said second stream, and is responsive to said second request to switch from said first stream to said second stream and provides said second stream to said mobile device without disconnecting said streaming session.

One aspect provides an article of manufacture for a mobile communication environment. The article of manufacture includes a computer-readable medium having instructions stored thereon that are executable by a processor to switch from a first live encoded stream of media to a second live encoded stream of media, by: obtaining said first and second streams from one or more sources; processing a first request for said first stream received from a mobile device; providing the requested first stream to said mobile device in a streaming session; processing a second request from said mobile device to switch from said first stream to said second stream; and responsive to said second request, switching from said first stream to said second stream and providing said second stream to said mobile device without disconnecting said streaming session.

One aspect provides streaming server in a mobile communication environment to switch from a first live encoded stream of media to a second live encoded stream of media. The server includes a first interface to receive said first and second streams from one or more sources; a second interface to receive a first request for said first stream from a mobile device; and a processor unit coupled to the first and second interfaces to provide the requested first stream to said mobile device in a streaming session via the second interface, the processor unit further being coupled to the first and second interfaces to receive a second request from said mobile device to switch from said first stream to said second stream and is responsive to said second request to switch from said first stream to said second stream and provide said second stream to said mobile device via the second interface without disconnecting said streaming session.

One aspect provides a mobile client device in a mobile communication environment that is capable to switch from receiving a first live encoded stream of media to receiving a second live encoded stream of media. The device includes a communications module to send a first request to a server to receive said first stream in a streaming session; a user interface; and a processor unit coupled to the communication module and to the user interface to provide the first stream received via the communications module to the user interface, the processor unit further being coupled to the communications module to send a second request to said server to switch from said first stream to said second stream and to provide said second stream to said communications module without disconnecting said streaming session.

BRIEF DESCRIPTION OF THE SEVERAL VIEWS OF THE DRAWINGS

Non-limiting and non-exhaustive embodiments are described with reference to the following drawings, wherein like reference numerals refer to like parts throughout the various views unless otherwise specified. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations associated with mobile devices, computer and/or telecommunications networks, and/or computing systems are not shown or described in detail to avoid obscuring aspects of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

An embodiment provides a system for reducing latency associated with accessing multiple sources of content provided to a mobile device. In one implementation, a streaming server receives multiple live encoded streams and makes the received encoded streams available to the mobile device. The mobile device instructs the streaming server as to which received encoded streams to provide to the mobile device. When the instructions indicate that the mobile device is requesting a different encoded stream, the streaming server switches the content streamed to the mobile device and provides the newly desired content to the mobile device.

Figure 1:
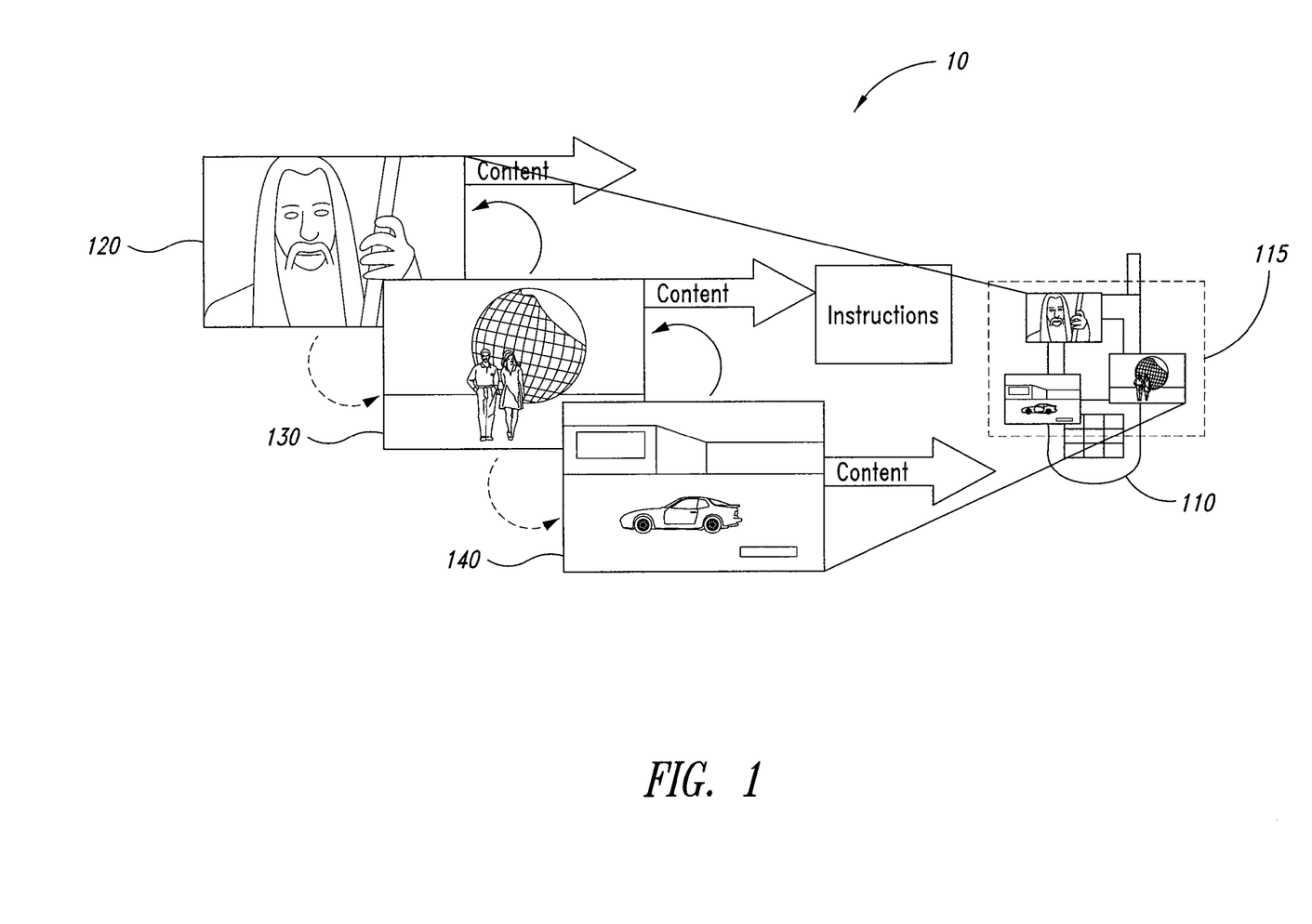
FIG. 1 illustrates a communication environment according to one embodiment.

In FIG. 1, a communication environment 10 is a communication environment illustrating the sending of multiple types of content to a mobile device based on instructions received from the mobile device. Communication environment 10, as shown, includes mobile device 110, received content 115, and available content 120-140. Mobile device 110 is a two-way telecommunications device that is currently operating within communication environment 10. Received content 115 is content received at mobile device 110 and available for display to a user interface (such as a display screen or other audiovisual output) of the mobile device 110. Available content 120-140 are multiple streams of content available at a streaming server (described in FIGS. 2A-2B, below) for transmitting to mobile device 110.

In operation, a user operating a user interface within the mobile device 110 selects content to be sent to the mobile device by a streaming server. The user may then select alternate content, which has previously been made available and is currently streaming to the streaming server, for delivery to the mobile device and display on the user interface, such as received content 115. In one embodiment, a user utilizing a user interface within mobile device 110 selects content 120 to be sent to the mobile device by a streaming server (not shown). The user may then select content 130 that has previously been made available and is currently streaming to the streaming server, for delivery to mobile device 110 and in effect switching from content 120 to content 130. Additionally, the user may then select content 140 that has previously been made available and is currently streaming to the streaming server, for delivery to mobile device 110 and in effect switching from content 130 to content 140. This switching from a particular stream of content to another stream of content can continue for other available content.

Figure 2A:
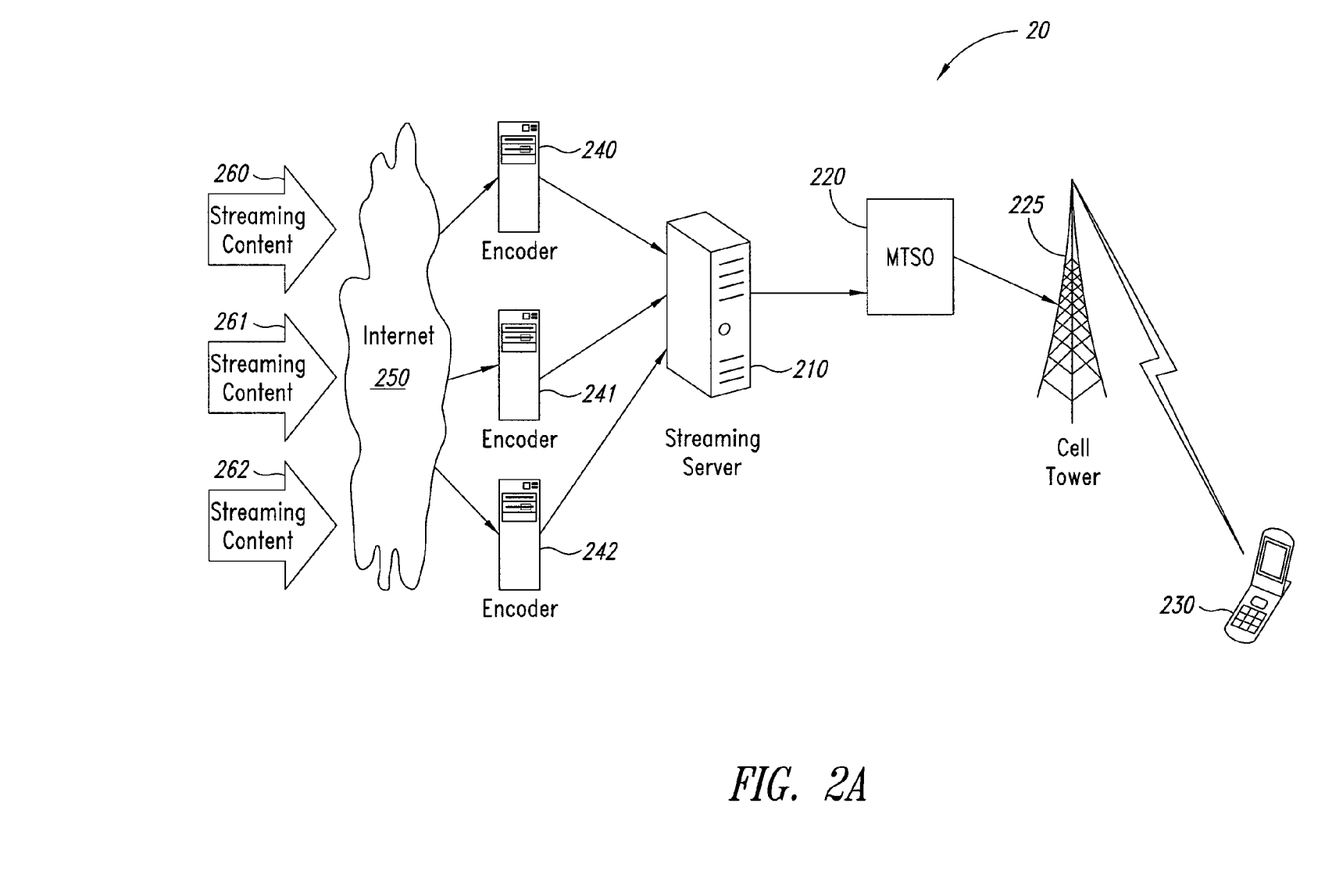
FIG. 2A illustrates a communication system according to one embodiment.

In FIG. 2A, a communications system 20 is a cellular communication network for transmitting and receiving voice and/or data communications to mobile devices. Communications system 20, as shown, includes at least one streaming server 210, mobile device 230, mobile telephone switching office (MTSO) 220, cellular communications tower 225, encoders 240-242, Internet 250, and streaming content 260-262. Mobile device 230 is a two-way telecommunications device that is compatible with communication system 20 and, as illustrated, is currently operating within communication system 20. Streaming server 210 is a dedicated server that provides content, converted to a streaming format suitable for wireless application, to mobile device 230 via MTSO 220 and cell tower 225. Streaming server 210 receives instructions (shown in FIG. 1) from mobile device 230 and streams content to mobile device 230 based on the received instructions. MTSO 220 prepares and configures the streaming content for a streaming transmission to a particular mobile device, such as within the geographic area of cell tower 225. Accordingly, MTSO 220 causes cell tower 225 to propagate the streaming content. Mobile device 230, operating within the geographic area of cell tower 225, receives the streaming content and provides the received content to the user.

Mobile device 230 is configured for two-way communication with streaming server 210 including voice communication and data streaming. Mobile device 230 includes a graphical user interface (GUI) capable of displaying received content as well as features allowing functionality (e.g., a keypad, a touch-screen video display, etc.). Mobile device 230 can be implemented as any commercially available mobile device, such as a cellular phone, a personal data assistant (PDA) equipped with cellular capabilities, and the like.

Streaming content 260-262 is any available content that is available from an IP address (e.g., a universal resource locator (URL), an http address, other network location, and the like). In one embodiment, streaming content is connected to a live encoder directly through a video capture card, for example an AV output cable of a TV signal can be connected to a live encoding machine through a video capture card (e.g., an Osprey card from ViewCast). In another embodiment, streaming content can also be transmitted via the Internet. Internet 250 is a worldwide decentralized network of users that are linked for the exchange of data, news, conversation, and commerce.

Encoders 240-242 are live encoders (e.g., Xenon Live Encoder from Vidiator) that receive streaming content and produce live encoded streams based on the received content. In an alternative embodiment, each encoder 240-242 receives multiple streams of content and produces multiple live encoded streams based on the received multiple streams of content. The live encoded streams are then injected into streaming server 210.

Streaming server 210 is in communication with encoders 240-242. In one embodiment, the encoders 240-242 are remote from and separate from the streaming server 210. In another embodiment, at least one of the encoders 240-242 may be integrated in the streaming server 210.

Streaming server 210 includes programming to receive live encoded streams from the encoders 240-242 and produce a metafile containing the IP address and the encoding stream ID for each live encoded stream. If the metafile is requested to be streamed to the mobile device, streaming server 210 streams the first live encoded stream (e.g., from encoder 240) to the mobile device. When instructions are received from mobile device 230 to provide a different live encoded stream from streaming server 210, streaming server 210 provides a different live encoded stream to the mobile device based on the received instructions.

Figure 2B:
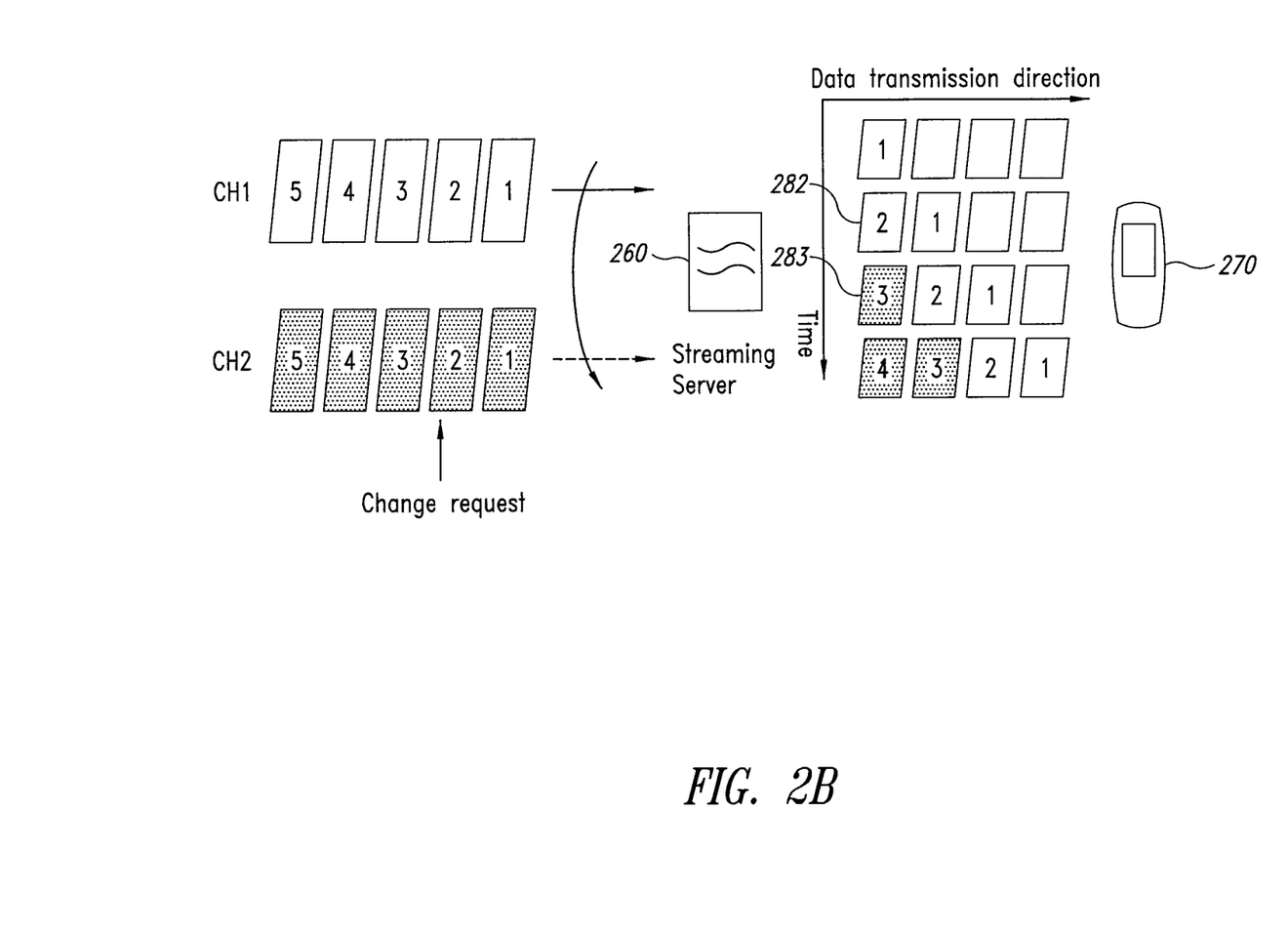
FIG. 2B illustrates switching by a streaming server according to one embodiment.

FIG. 2B illustrates one embodiment of a streaming server 260 that switches from one input stream to another without disconnecting the ongoing session between streaming server 260 and a mobile device 270. For example, in FIG. 2B, streaming server 260 is receiving two streams from live encoders (not shown) while streaming server 260 sends the CH1 stream to mobile device 270. If streaming server 260 receives an instruction for a channel change from mobile device 270 while streaming server is communicating data packet 2 282, streaming server 260 changes input from the CH1 stream to the CH2 stream and starts sending packets from the packet number 3 283 of the CH2 stream. In this example, if there was buffering time required on the mobile device-side due to selection of PAUSE, mobile device 270 can maintain the current (CH1) streaming session with streaming server 260. In a typical live streaming service, the user must disconnect the streaming session between the mobile device and the streaming server to revert to a mobile portal page and then select another live streaming content to invoke the streaming player and thereby initiate another streaming session with the streaming server.

Figure 3:
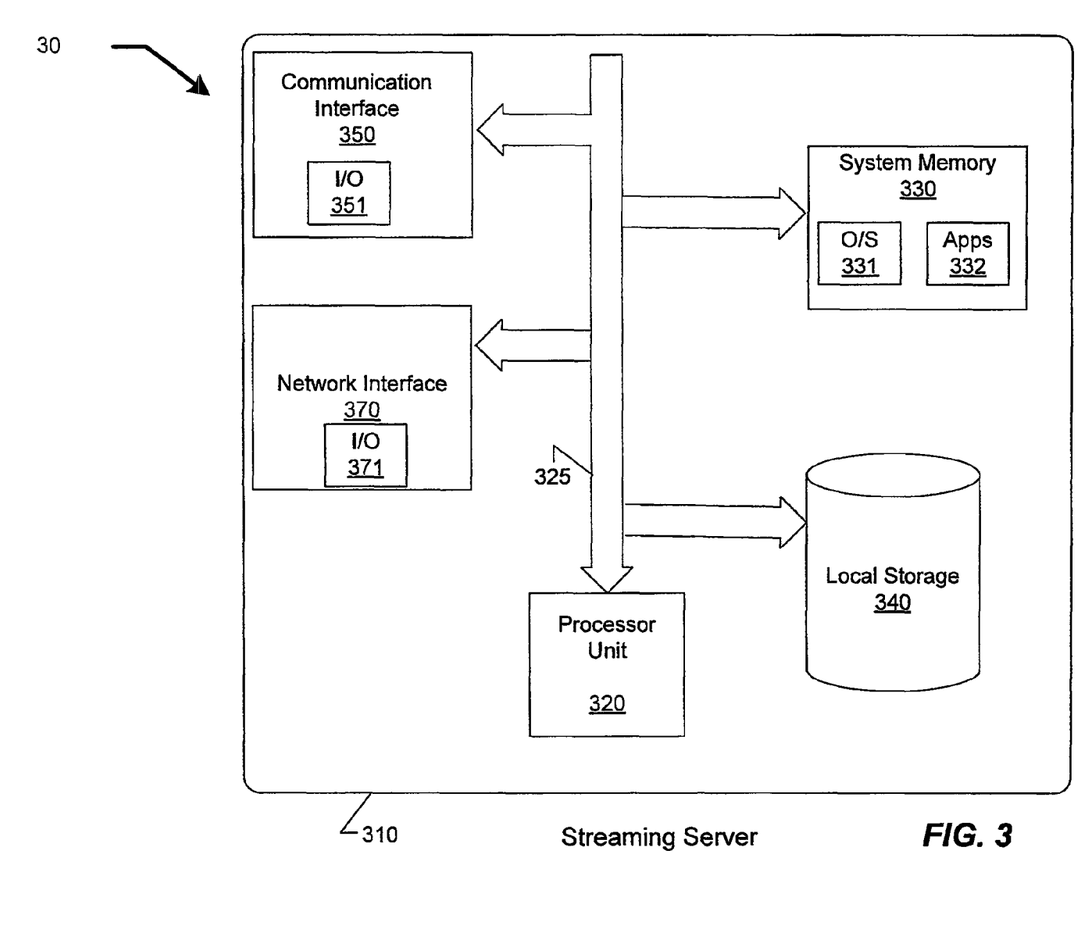
FIG. 3 is a block diagram of an embodiment of the streaming server.

In FIG. 3, a computing environment 30 includes a streaming server 310 that may be implemented as any streaming server capable of receiving live encoded streams from one or more encoders and producing a metafile containing the IP address for each live encoded stream. Examples of streaming servers include server computing devices, laptop computers, desktop computers, minicomputers, mainframe computers, headless servers and the like. An embodiment of the invention may also be practiced in distributed computing environments where certain tasks are performed by remote processing devices linked through a communications network. In a distributed computing environment, program modules may be located in both local and remote memory storage devices.

The streaming server 310 includes a processing unit 320, a system memory 330, and a system bus 325 that couples various system components including the system memory 330 to the processing unit 320. The streaming server 310 may further include local storage 340, such as a one or more hard disk drives or other non-volatile storage capacity for reading from and writing to a hard disk (not shown).

The drives and their associated computer-readable media provide non-volatile storage of computer-readable instructions (such as a computer program), data structures, program modules and other data for the streaming server 310. The stored computer program and/or program modules of one embodiment can be executed by the processing unit 320 to perform the method of streaming content as described herein.

A number of program modules may be stored on the system memory 330 including an operating system 331, one or more application programs 332, other program modules and program data. An example of an application stored on the system memory includes an application to generate a metafile based on received live encoded streams. The program modules stored on the system memory 330, on the local storage 340, and/or on some other computer-readable medium (such as a memory) of the streaming server 310 can be executed by one or more processors (such as the processing unit 320) to perform one or more operations of the various embodiments of the method to stream content described herein.

The streaming server 310 may operate in a networked environment using logical connections to one or more remote computers, encoders, and the like. The remote devices may be an encoder, a server, a router, a network PC, a peer device or other common network node, and typically includes many or all of the elements described above relative to the streaming server 310. Such networking environments may be present in offices, enterprise-wide computer networks, Intranets and the Internet. When used in a LAN networking environment, the streaming server 310 is connected to the local network through network interface 370 or an adapter. When used in a WAN networking environment, the streaming server 310 typically includes a modem or other means for establishing communications over the wide area network, such as the Internet. The streaming server 310 may operate in a networked environment using communication interface 350 that typically includes a modem or other means for establishing communications via the Internet to a MTSO, such as when delivering content to a requesting mobile device. In such embodiments, the modem, which may be internal or external, is connected to the system bus 325 via the serial port interface within associated I/O module interfaces 351 and 371, respectively.

Figure 4:
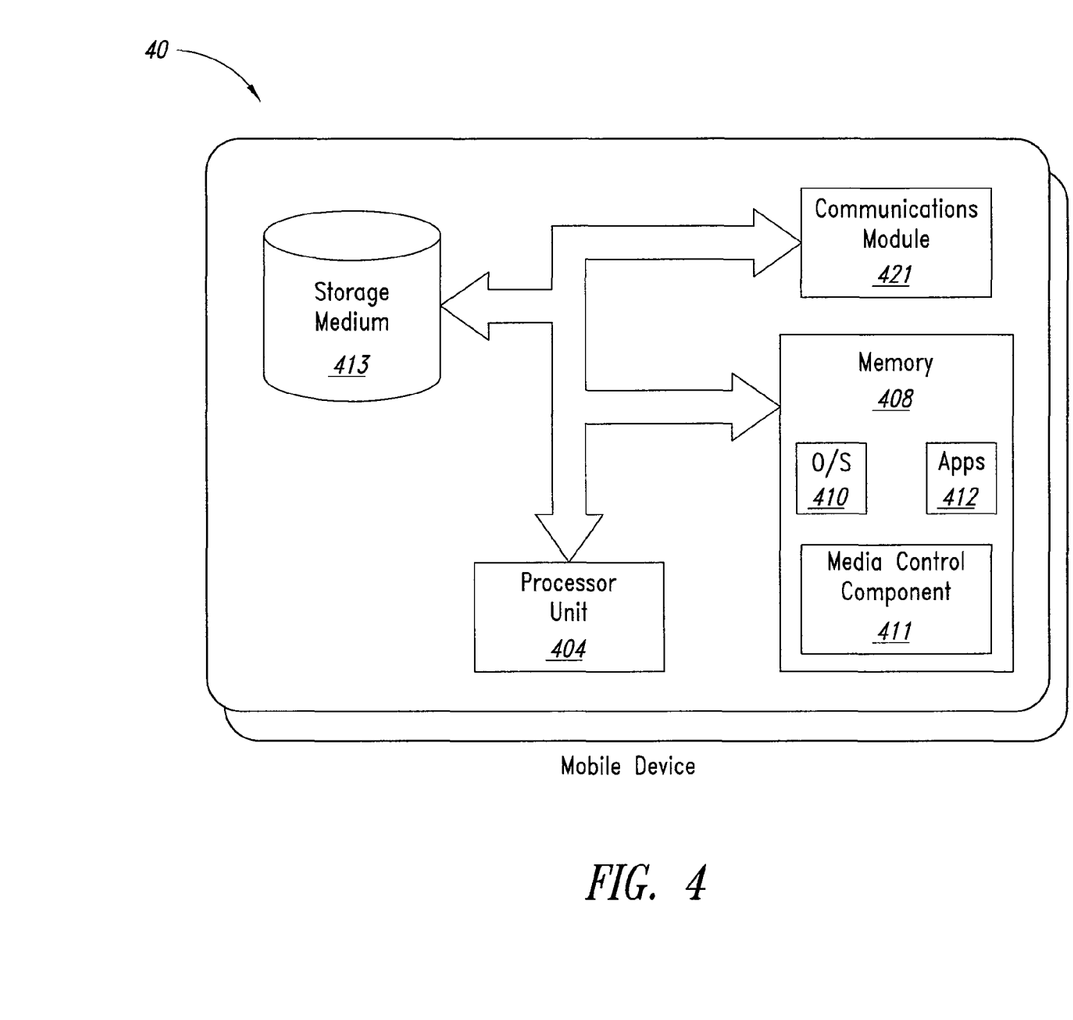
FIG. 4 is a block diagram of an embodiment of a mobile device.

In FIG. 4, the mobile device 40 of one embodiment may be any handheld computing device, such as a cellular telephone, a personal digital assistant with cellular connectivity, or the like. In this example, mobile device 40 includes a processor unit 404, a memory 408, and a storage medium 413 (such as a computer-readable storage medium, like a memory). The processor unit 404 advantageously includes a microprocessor or a special-purpose processor such as a digital signal processor (DSP), but may in the alternative be any suitable form of processor, controller, microcontroller, or state machine. Mobile device 40 may also include additional components that are not described in detail herein, for the sake of brevity.

The processor unit 404 is coupled to the memory 408, which is advantageously implemented as RAM memory storing software instructions (such as a computer program) that are executed by the processor unit 404. In this embodiment, the software instructions stored in the memory 408 include one or more applications 412 (e.g., an application providing available content options and executing user instructions for obtaining the content); a media control component 411, and an operating system 410. The memory 408 may be on-board RAM, or the processor unit 404 and the memory 408 could collectively reside in an Application Specific Integrated Circuit (ASIC). In an alternate embodiment, the memory 408 may be composed of firmware or flash memory, such as a SmartMedia card.

The processor unit 404 is also coupled to the storage medium 413, which may be implemented as any nonvolatile memory, such as ROM memory, flash memory, or a magnetic disk drive, just to name a few. The storage medium 413 may also be implemented as any combination of those or other technologies, such as a magnetic disk drive with cache (RAM) memory, or the like. In this particular embodiment, the storage medium 413 is used to store data during periods when the mobile device 40 may be powered off or without power.

The mobile device 40 also includes a communications module 421 that enables bidirectional communication between the mobile device 40 and one or more other computing devices. The communications module 421 may include components to enable RF or other wireless communications, such as a cellular telephone network, Bluetooth connection, or a wireless local or wide area network.

Alternatively or additionally, the communications module 421 may include components to enable land line or hard wired network communications, such as an Ethernet connection, universal serial bus connection, IEEE 1394 (Firewire) connection, or the like.

In operation, a user accesses streaming content utilizing one or more applications running within application 412 via media control component 411. The applications are running on processing unit 404. The resulting streamed media content that mobile device 40 receives via communication module 421 may be temporarily stored at storage medium 413 prior to being passed to the GUI (not shown) for display to the user. When a user instructs that she wishes to receive different content, mobile device 40 communicates the instruction to a streaming server (such as those shown and described above). When mobile device 40 receives the requested content, the content is provided to the user.

Figure 5:
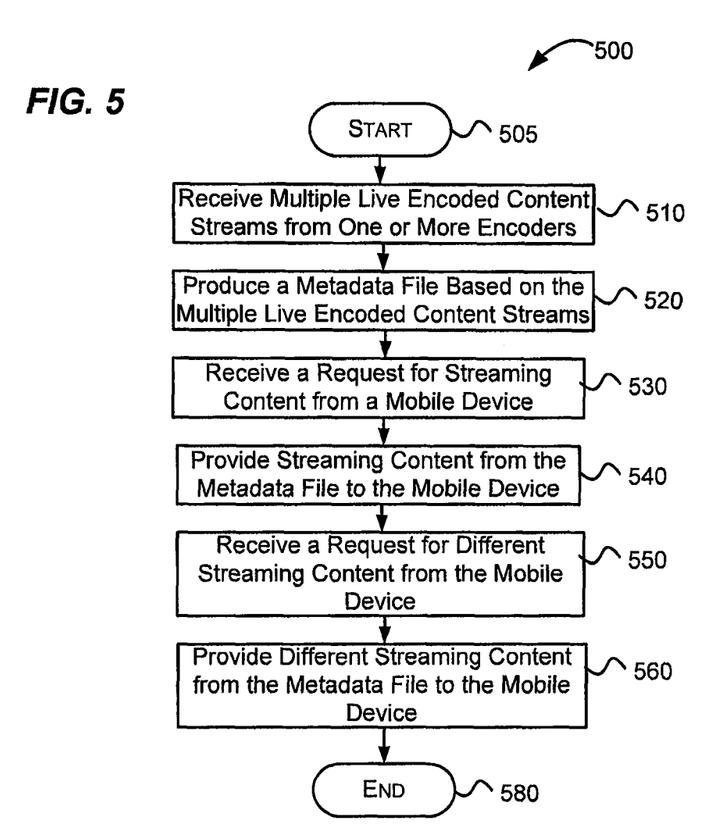
FIG. 5 is a flow diagram of an embodiment of a method for providing improved content switching in a mobile device communication network.

FIG. 5 is a flow diagram summary of a method for providing improved content switching in a mobile device communication network. In one embodiment, the various operations of the method may be performed by execution of a computer program by a processor. For example, the various application programs and/or other computer-readable instructions described above may be executed by one or more processors described above to perform the operations of the method depicted in FIG. 5.

The various operations depicted in FIG. 5 need not necessarily occur in the exact order shown. Moreover, various operations can be added, removed, combined, or modified.

The method starts at step 505. At step 510, a streaming server receives live encoded content streams from one or more encoders. In one embodiment, the streaming server receives a single stream of live encoded content from at least a plurality of live encoders. In another embodiment, the streaming server receives multiple streams of live encoded content from at least one live encoder. At step 520, the streaming server produces a metadata file based on the received multiple live encoded content streams. The metadata file includes the IP address for each live encoded stream associated with each of the live encoders.

At step 530, the streaming server receives a request for content from a mobile device. At step 540, the streaming server provides the live encoded streaming content from the metadata file to the mobile device. In one embodiment, the streaming server provides the first live encoded stream, from the plurality of live encoded streams within the metadata file, to the mobile device.

At step 550, a request for different streaming content is received from the mobile device. In one embodiment, the request is generated at the mobile device via user interaction with the user interface (U/I). In an example, the request is generated at the mobile device via the user activating the "pause" function followed by the user activating the "PLAY" function of the GUI of the mobile device. In this example, when the "PAUSE" instruction is received, the streaming session is paused. When the "PLAY" instruction is received, the streaming server starts streaming the next live encoded streaming content in the metafile. In another example and detailed below, the request is generated at the mobile device via the user activating the "FAST FORWARD" or "REWIND" function. In either instance of the user activating the "FAST FORWARD" or "REWIND" function, the mobile device communicates a "PAUSE" function followed by the "PLAY" function to the streaming server.

At step 560, the streaming server provides different live streaming content to the mobile device. In one embodiment, based on analysis of the received instruction (e.g., a "PAUSE" function followed by a "PLAY" function) from the mobile device, the streaming server determines which different live encoded stream(s) within the metadata file it will communicate to the mobile device. In an example, the streaming server will communicate the next live encoded stream within the metadata file to the mobile device. In another embodiment, the streaming server will communicate the previous live encoded stream within the metadata file to the mobile device. If no more streams are to be communicated, the method ends at step 580.

Thus according to various embodiments described above, from a user's point of view, a user can search for a live URL in a WAP or WEB page. If a user selects a link, a native streaming player is invoked and connects the streaming server for the live streaming session. In conventional streaming server configurations, once a live session is started a user cannot change to some other live streaming session because there are only 'PAUSE' and 'PLAY' buttons within a typical native player's user interface (U/I). That is, the PAUSE button is only available while a live session is being played. Therefore, if the PAUSE button is selected, the PLAY button is enabled with a typical streaming player. In contrast, an embodiment as described above provides a streaming server that utilizes 'PAUSE' and 'PLAY' button commands from a handset of the mobile device for live channel change. In operation, if the streaming server gets the 'PAUSE' command, it pauses the on-going live session. Next, if the 'PLAY' button is selected, the streaming server changes the input content to the next input content and streams the next input content to the mobile device.

In another embodiment, the 'PAUSE' button is enabled or otherwise made available for the actual 'PAUSE' purpose. In this alternative embodiment, a live streaming session is streamed as a file streaming session with a very long duration. In an example, if the streaming server communicates to the mobile device that the streaming session is bounded (e.g., has a relatively short/finite duration) with a range such as 0.00 to 10000.00 ms, the mobile device considers the session to be a file streaming session, and the PAUSE and PLAY buttons can be enabled as described above for switching streams. However, if the streaming server communicates to the mobile device that the streaming session is unbounded with a relatively long range such as 0.00 to ∞ (infinity), the mobile device considers the session to be a live session.

In this embodiment, the mobile device can be manipulated into allowing a user to utilize the PAUSE button for its intended purpose as well as utilize 'FAST FORWARD' for signaling the streaming server to the next channel and 'REWIND' for the previous channel.

International Application No. PCT/US2006/004896, entitled "METHOD OF MULTIPLE FILE STREAMING SERVICE THROUGH PLAYLIST IN MOBILE ENVIRONMENT AND SYSTEM THEREOF," filed Feb. 10, 2006, which in turn claims priority from Korean Patent Application No. 10-2005-0011679, filed Feb. 11, 2005, both assigned to the same assignee as the present application, are incorporated herein by reference in their entireties.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible.

These and other modifications can be made to the embodiments in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method in a mobile communication environment to switch from a first encoded stream of content to a second encoded stream of content, the method comprising:
    receiving said first and second encoded streams of content from one or more sources;
    receiving a first request for said first encoded stream of content from a mobile device;
    providing the requested first encoded stream of content to said mobile device in a streaming session;
    receiving a second request from said mobile device to switch from said first encoded stream of content to said second encoded stream of content; and
    responsive to said second request, switching from said first encoded stream of content to said second encoded stream of content and providing said second encoded stream of content to said mobile device without disconnecting said streaming session,
    wherein said second request from said mobile device is generated in response to:
        activation of a PAUSE button on said mobile device to cause said streaming session to pause in providing said first encoded stream of content to said mobile device;
        responsive to said activation of said PAUSE button, enablement of a PLAY button on said mobile device; and
        activation of said PLAY button after said activation of said PAUSE button to cause said streaming session to switch from providing said first encoded stream of content to providing said second encoded stream of content as input to said mobile device for playback.

2. The method of claim 1 wherein said activation of said PAUSE button and said enablement and activation of said PLAY button are allowed if said first and second encoded streams of content have a short duration, the method including if said first encoded stream of content has a long duration relative to said short duration:
    responsive to said activation of said PAUSE button on said mobile device, pausing the streaming session in providing said first encoded stream of content;
    responsive to said activation of said PAUSE button, enabling a FAST FORWARD button and a REWIND button on said mobile device;
    responsive to activation of said FAST FORWARD button, causing said streaming session to switch from providing said first encoded stream of content to providing said second encoded stream of content as input to said mobile device; and
    responsive to activation of said REWIND button, causing said streaming session to switch from providing said first encoded stream of content to providing another encoded stream of content as input to said mobile device.

3. An article of manufacture for a mobile communication environment, the article of manufacture comprising:
    a non-transitory computer-readable medium having instructions stored thereon that are executable by a processor to switch from a first encoded stream of content to a second encoded stream of content, by:
        obtaining said first and second encoded streams of content from one or more sources;
        processing a first request for said first encoded stream of content received from a mobile device;
        providing the requested first encoded stream of content to said mobile device in a streaming session;
        processing a second request from said mobile device to switch from said first encoded stream of content to said second encoded stream of content; and
        responsive to said second request, switching from said first encoded stream of content to said second encoded stream of content and providing said second encoded stream of content to said mobile device without disconnecting said streaming session,
    wherein said instructions to process said second request are executed in response to:
        activation of a PAUSE button on said mobile device to cause said streaming session to pause in providing said first encoded stream of content to said mobile device;
        responsive to said activation of said PAUSE button, enablement of a PLAY button on said mobile device; and
        activation of said PLAY button after said activation of said PAUSE button to cause said streaming session to switch from providing said first encoded stream of content to providing said second encoded stream to said mobile device for playback.

4. The article of manufacture of claim 3 wherein said activation of said PAUSE button and said enablement and activation of said PLAY button are allowed if said first and second encoded streams of content have a short duration, wherein if said first encoded stream of content has a long duration:
- responsive to activation of said PAUSE button on said mobile device, the streaming session is paused in providing said first encoded stream of content;
- responsive to said activation of said PAUSE button, activation of a FAST FORWARD button and a REWIND button on said mobile device;
- responsive to activation of said FAST FORWARD button, said streaming session is caused to switch from providing said first encoded stream of content to providing said second encoded stream of content to said mobile device for playback; and
- responsive to activation of said REWIND button, said streaming session is caused to switch from providing said first encoded stream of content to providing another encoded stream of content to said mobile device for playback.

5. A streaming server in a mobile communication environment to switch from a first encoded stream of content to a second encoded stream of content, the server comprising:
- a first interface to receive said first and second encoded streams of content from one or more sources;
- a second interface to receive a first request for said first encoded stream of content from a mobile device;
- a processor unit coupled to the first and second interfaces to provide the requested first encoded stream of content to said mobile device in a streaming session via the second interface, the processor unit further being coupled to the first and second interfaces to receive a second request from said mobile device to switch from said first encoded stream of content to said second encoded stream of content and is responsive to said second request to switch from said first encoded stream of content to said second stream and to provide said second encoded stream of content to said mobile device via the second interface without disconnecting said streaming session,
- wherein said second request from said mobile device is provided in response to:
  - activation of a PAUSE button on said mobile device to cause said processor unit to pause in providing said first encoded stream of content to said mobile device via said streaming session;
  - responsive to said activation of said PAUSE button, enablement of a PLAY button on said mobile device; and
  - activation of said PLAY button after said activation of said PAUSE button to cause said processor unit to switch input to said streaming session from said first encoded stream of content to said second encoded stream of content.

6. The server of claim 5 wherein said one or more sources include one or more encoders to provide live encoded streams.

7. The server of claim 5 wherein said activation of said PAUSE button and said enablement and activation of said PLAY button is allowed if said first and second encoded streams of content have a short duration, the processor unit being adapted to perform, if said first stream has a long duration:
- responsive to activation of said PAUSE button on said mobile device, pause the providing of said first encoded stream of content via the streaming session;
- responsive to said activation of said PAUSE button, recognize activation of a FAST FORWARD button and a REWIND button on said mobile device;
- responsive to activation of said FAST FORWARD button, cause said streaming session to switch from said first encoded stream of content to said second encoded stream of content; and
- responsive to activation of said REWIND button, cause said streaming session to switch from said first encoded stream of content to another encoded stream of content.

8. The server of claim 5, further comprising at least one computer-readable memory coupled to said processor unit to store computer-readable instructions executable by said processor unit to perform said switching.

9. A mobile client device in a mobile communication environment that is capable to switch from receiving a first encoded stream of content to receiving a second encoded stream of content, the device comprising:
- a communications module to send a first request to a server to receive said first encoded stream of content in a streaming session;
- an output interface and input unit; and
- a processor unit coupled to the communication module and to the output interface to provide the first encoded stream of content received via the communications module to the output interface, the processor unit further being coupled to the communications module to send a second request to said server to switch from providing said first encoded stream of content to providing said second encoded stream of content and to provide said second encoded stream of content to said communications module without disconnecting said streaming session,
- wherein said second request is provided by said processor unit in response to:
  - activation of a PAUSE button of said input unit to cause said processor unit to generate and send said second request, said second request further able to cause said streaming session to pause in providing said first encoded stream of content to said mobile device, the processor unit being adapted to enable a PLAY button on said input unit in response to said activation of said PAUSE button; and
  - activation of said PLAY button after said activation of said PAUSE button to cause said processor unit to send said second request to switch said streaming session from said first encoded stream of content to said second encoded stream of content.

10. The device of claim 9 wherein said output interface includes a display unit to present said first and second encoded streams of content, and wherein said input unit is coupled to said processor unit to receive commands to send said first and second requests.

11. The device of claim 9 wherein said activation of said PAUSE button and said enablement and activation of said PLAY button is allowed if said first and second encoded streams of content have a short duration, the processor unit being adapted to perform, if said first encoded stream of content has a long duration relative to said short duration:
- responsive to said activation of said PAUSE button, enable activation of a FAST FORWARD button and a REWIND button on said input unit;

responsive to activation of said FAST FORWARD button, send said second request to switch input of said streaming session from said first encoded stream of content to said second encoded stream of content; and responsive to activation of said REWIND button, send said second request to switch input of said streaming session from said first encoded stream of content to another encoded stream of content.

12. The device of claim 11 wherein said short duration is between 0 and 10,000 ms, and wherein said long duration is greater than 10,000 ms.

13. The device of claim 11 wherein said FAST FORWARD and REWIND buttons are disabled if said first stream has the short duration.

14. The device of claim 9 wherein the processor, communications module, and display unit are part of a cellular telephone, personal digital assistant, laptop, or portable wireless electronic device.

* * * * *